US006216987B1

(12) United States Patent
Fukuo (10) Patent No.: US 6,216,987 B1
(45) Date of Patent: Apr. 17, 2001

(54) ROD HOLDER FOR ROD MEMBERS WITH VARIOUS SHAPES (75) Inventor: Michihiro Fukuo, Tokyo (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/249,438

(22) Filed: Feb. 12, 1999

(30) Foreign Application Priority Data

Feb. 16, 1998 (JP) .................................................. 10-050091

(51) Int. Cl.$^7$ ...................................................... F16L 3/08
(52) U.S. Cl. .................................. 248/74.2; 248/229.16; 248/316.1; 248/316.7
(58) Field of Search ............................. 248/316.1, 229.1, 248/228.7, 230.7, 231.9, 74.2, 229.26, 229.16, 74.1, 500, 316.7, 257, 266, 231.81

(56) References Cited

U.S. PATENT DOCUMENTS

| 1,308,869 | * | 7/1919 | Rohmer | 248/69 |
| 1,805,742 | * | 5/1931 | Reynolds | 248/251 |
| 2,166,916 | * | 7/1939 | Lombard | 248/73 |
| 2,657,442 | * | 11/1953 | Bedford, Jr. | 248/74.2 |
| 2,712,917 | * | 7/1955 | Flora et al. | 403/397 |
| 3,181,827 | * | 5/1965 | Sassin | 248/74.2 |
| 3,216,685 | * | 11/1965 | Raymond | 248/74.2 |
| 3,807,675 | * | 4/1974 | Seckerson et al. | 248/73 |
| 3,944,177 | * | 3/1976 | Yoda | 248/74.2 |
| 4,094,483 | * | 6/1978 | Busch | 248/73 |
| 4,119,285 | * | 10/1978 | Bisping et al. | 248/72 |
| 4,375,879 | * | 3/1983 | Kojima et al. | 248/73 |
| 4,566,660 | * | 1/1986 | Anscher et al. | 248/74.2 |
| 4,681,288 | * | 7/1987 | Nakamura | 248/71 |
| 4,840,334 | * | 6/1989 | Kikuchi | 248/73 |
| 5,133,523 | * | 7/1992 | Daigle et al. | 248/62 |
| 5,460,342 | * | 10/1995 | Dore et al. | 248/74.2 |
| 5,533,696 | * | 7/1996 | Laughlin et al. | 248/74.2 |
| 5,588,683 | * | 12/1996 | Schliessner | 285/62 |
| 5,752,681 | * | 5/1998 | Janssen et al. | 248/65 |
| 5,765,787 | * | 6/1998 | de Beers et al. | 248/73 |
| 5,947,426 | * | 9/1999 | Kraus | 248/74.2 |

FOREIGN PATENT DOCUMENTS

| 1-34962 | 10/1989 | (JP) . |
| 2630917 | 4/1997 | (JP) . |

* cited by examiner

Primary Examiner—Anita M. King
Assistant Examiner—N. Morrison
(74) Attorney, Agent, or Firm—Kanesaka & Takeuchi

(57) ABSTRACT

A rod holder is provided with a holder main body having a rectangular holding portion therein, and an opening disposed at one side of the holder main body. The opening is enlarged when a rod member is inserted into the opening, and the opening is returned to an original condition when the rod member is held inside the rod holding portion. A window is provided at a side wall of the holder main body, and a rod receiving piece is formed in the window to project inside the holding portion. When a square rod member is held in the rod holding portion, the rod receiving piece can be elastically deformed by an outward pressing force of the rod member to be located inside the side wall. When a round rod member is held by the rod holder, the rod receiving piece engages a lower surface of the round rod member to hold the same. Thus, the rod holder of the invention can be used for holding both the square rod member and the round rod member.

8 Claims, 8 Drawing Sheets

ROD HOLDER FOR ROD MEMBERS WITH VARIOUS SHAPES

BACKGROUND OF THE INVENTION AND RELATED ART STATEMENT

The present invention relates to a rod holder for holding rod members, such as various kinds of pipes and rods, and particularly relates to a rod holder which can hold rod members having different shapes, such as round pipes and rectangular pipes.

Figure 7:
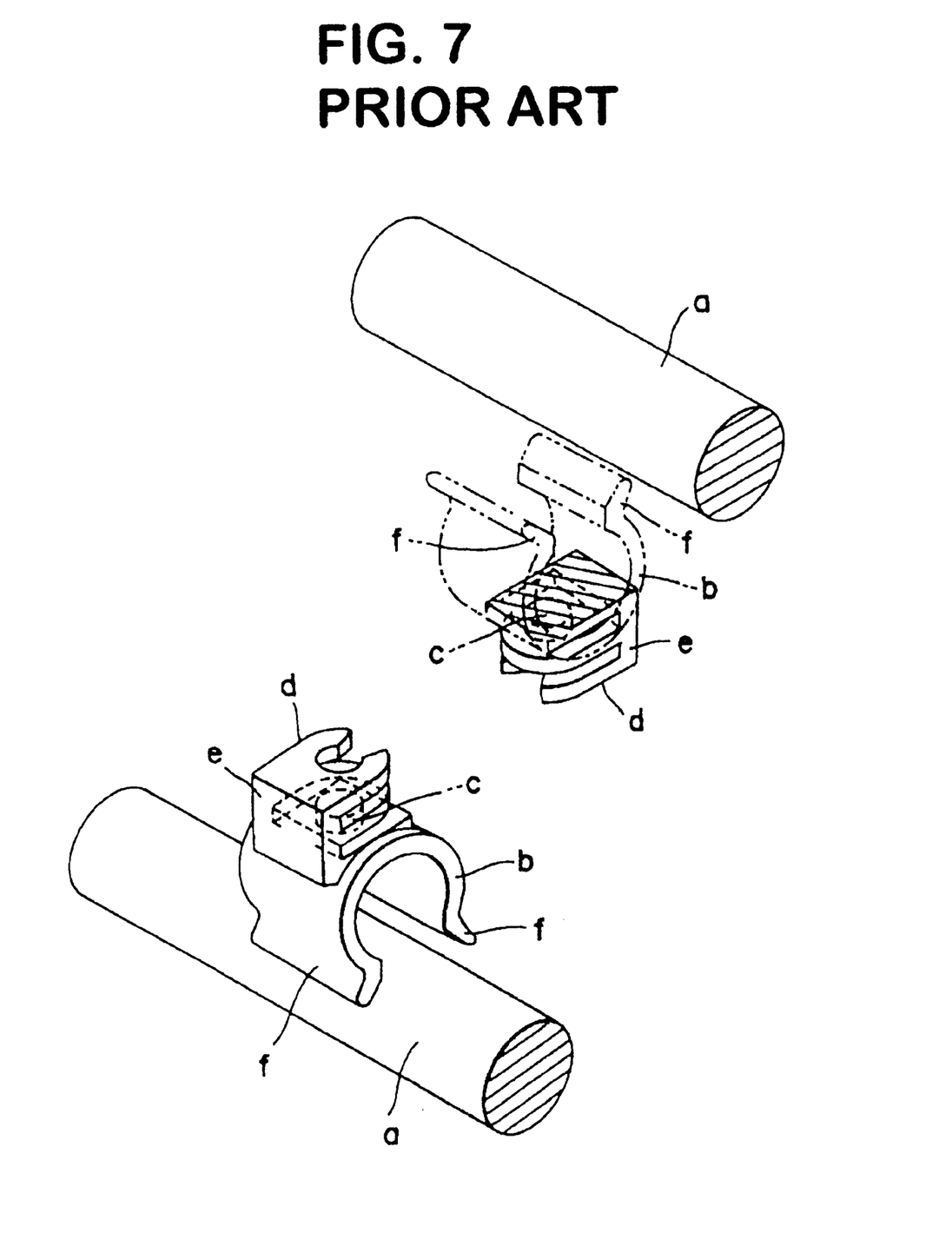
FIG. 7 is a perspective view showing an example of a conventional rod holder.

Conventionally, a rod holder made of a synthetic resin has been widely used for holding rod members, such as pipes, and as an example of the rod holder, a rod member disclosed in Japanese Utility Model Publication (KOKOKU) No. 1-34962 has been known. Namely, as shown in FIG. 7, this rod holder includes, as one unit, a holding section b at one end thereof for holding a round bar or round pipe a; and a pivotal attachment section e at the other end thereof, which is formed of an axis c and a clamping piece d extending perpendicular to an axial direction away from a distal end of the axis c and having an open side to which an outer periphery of an axis can be inserted. In this case, the holding section b is bent in a C-shape to have an open end, and opposing both ends are inclined outwardly to form introducing pieces f.

As clearly understood from the shape of the holding section b, the rod holder is used for holding the round bar or round pipe a.

Figure 8:
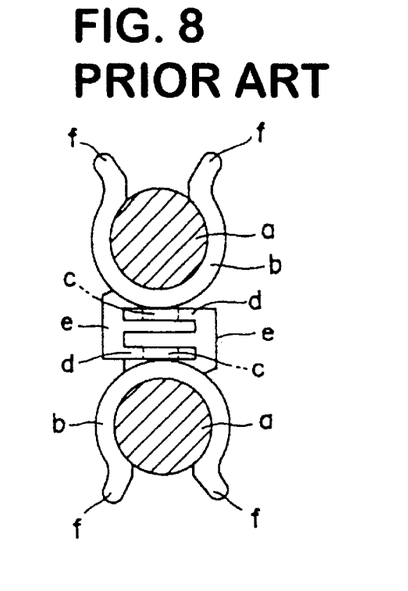
FIG. 8 is a front view showing a condition that rod members are held in the rod holder of FIG. 7.

Incidentally, as shown in FIG. 8, the rod holder disclosed in Japanese Utility Model Publication (KOKOKU) No. 1-34962 is used such that a pair of holders d having the same shape is connected to each other rotatably around the axes c by inserting the clamping piece of one holder into the axis c of the other rod holder, and vice versa.

Figure 9:
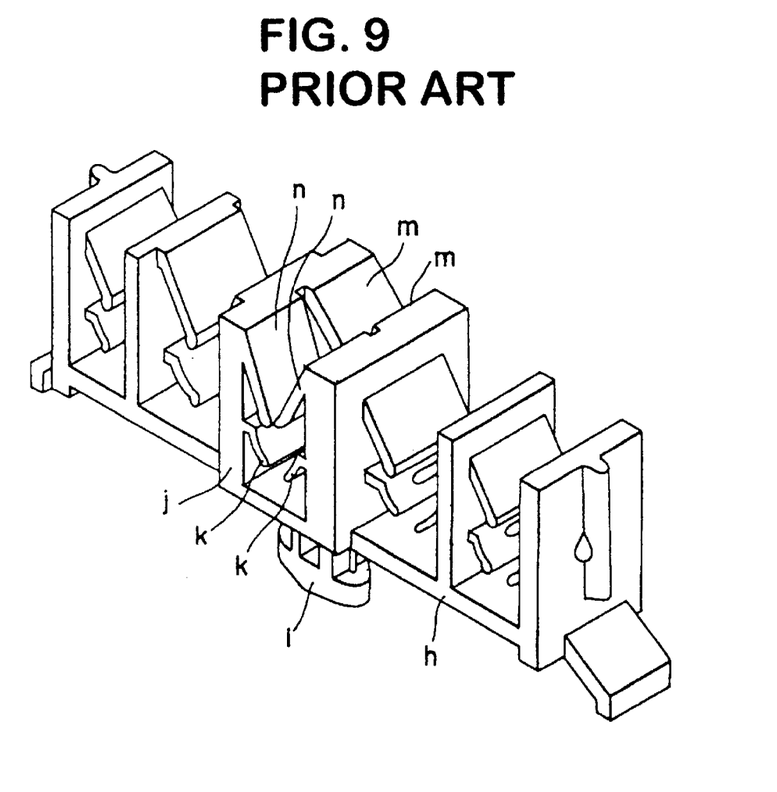
FIG. 9 is a perspective view of another example of a conventional rod holder.

Also, as a holder for holding a round bar or round pipe, a holder disclosed in Japanese Patent No. 2,630,917 has been known. FIG. 9 is a drawing explaining this holder, and the holder is formed of a base h; an engaging portion i projecting from one surface of the base h to engage a mounting hole; U-shaped walls j extending vertically from the other surface of the base; and a plurality of elastic disengagement prevention pieces m, n extending obliquely from the U-shaped walls j toward the base and having distal ends which support the rod member inside the U-shaped walls. A plurality of disengagement prevention pieces m, n is disposed to extend from the U-shaped walls j such that the pieces do not interfere with each other when the pieces are deformed toward the base, and a plurality of rod inserting paths having different widths is formed at distal ends of the respective elastic disengagement prevention pieces.

This holder has a plurality of disengagement prevention pieces m, n, and the rod inserting paths defined at the distal ends of the pieces m, n have different widths, respectively, so that even if the rod member has a different outer diameter, the rod member can be held between the U-shaped walls j by one of the disengagement prevention pieces, i.e. the piece m or n.

Figure 10:
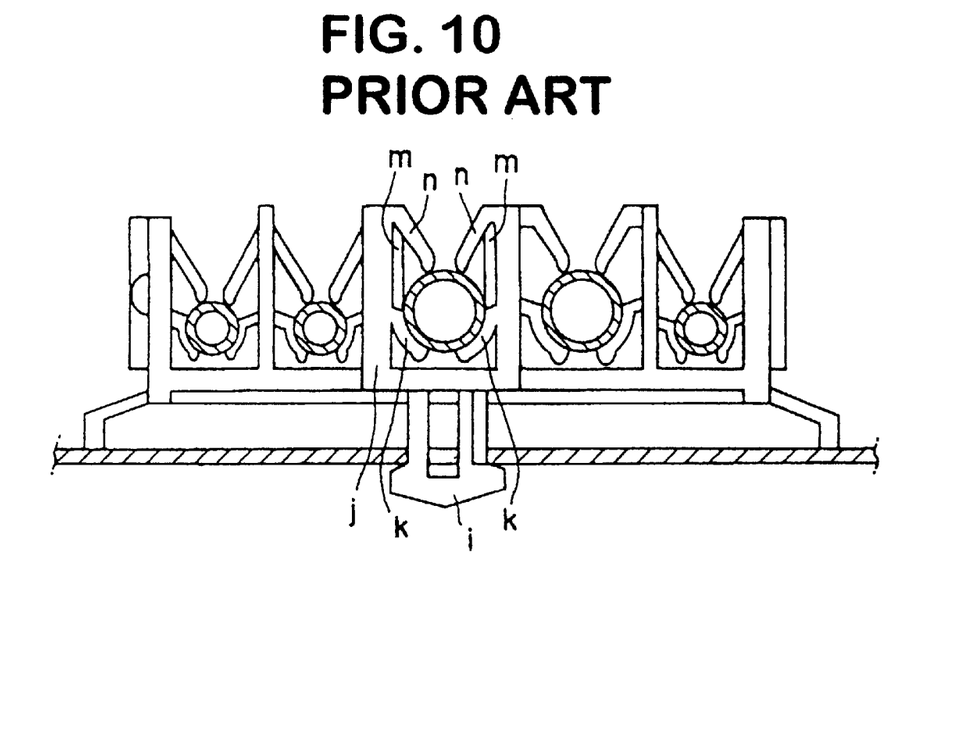
FIG. 10 is a front view showing a condition that the rod members are held in the rod holder of FIG. 9.

In this case, as shown in FIG. 10, the holder is structured such that receiving arms k respectively protrude downwardly from lower parts of the side walls. A lower surface of the round bar or pipe is supported by the receiving arms k, and an upper surface of the round bar or pipe is engaged with the disengagement prevention pieces n having a shorter length than the disengagement prevention pieces m, so that the round bar or pipe can be securely held.

Figure 11:
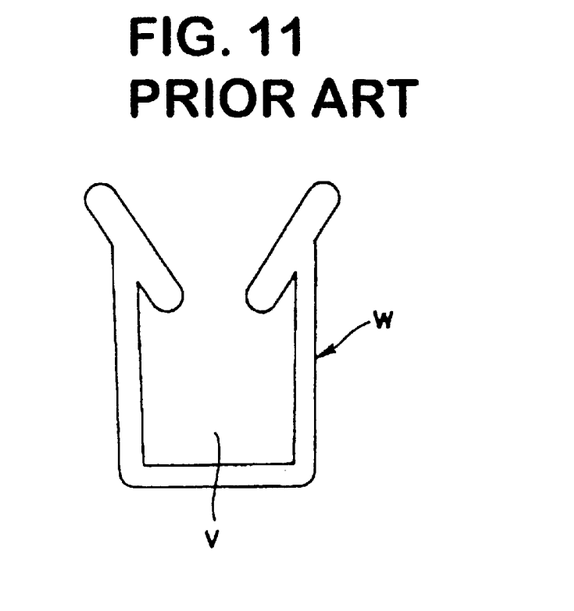
FIG. 11 is a front view showing a still further example of a conventional rod holder.

However, in the aforementioned rod holders of FIG. 7 through FIG. 10, the rod members held therein are limited to the members having a round section. In case of holding a rod member, such as rectangular pipe or bar having a rectangular section, as show in FIG. 11, it is necessary to use a holder w having a rectangular holding groove v therein. On the other hand, the holder shown in FIG. 11 is not suitable for holding the round pipe or bar.

Therefore, conventionally, it is required to independently or separately prepare a holder for holding a round pipe or bar and a holder for holding a square pipe or bar, to properly use one of the holders according to the rod members held therein.

The present invention has been made in view of the above problems, and an object of the invention is to provide a rod holder which can securely hold rod members irrespective of the shapes of the rod members, and more particularly, the rod holder which can hold both round pipes or bars and rectangular pipes or bars, so that the rod holder can be used widely.

Another object of the present invention is to provide a rod holder as mentioned above, which can be manufactured relatively easily at a low cost.

Further objects and advantages of the invention will be apparent from the following description of the invention.

SUMMARY OF THE INVENTION

To achieve the above objects, the present invention provides a rod holder, which is formed of a rod holding portion in a rectangular shape; and a holder main body which is elastically deformable to expand an opening outwardly when a rod member is pushed from the opening, wherein the opening is elastically returned to the original state when the rod member is inserted inside the rod holding portion. The holder is further provided with a window at a side wall of the holder main body, and at an upper portion of the window, there is formed a rod receiving piece which normally projects inside the holding portion and which is elastically deformed by an outward pressing force of the rod member to retreat or be located inside the side wall.

In this case, if a rod member, for example, has a round section, it can be engaged with the receiving piece. Also, if the rod member has a rectangular section, when the rod member is further pushed downwardly from an engaging condition by the receiving piece, a distal end of the receiving piece is pushed outwardly to deform elastically so that the receiving piece is moved back to be located inside the side wall. Then, when the rod member is further moved downwardly and abuts against a bottom of the holding portion, the movement is stopped and the rod member is held inside the holding portion.

As described above, according to the present invention, for example, in case a round rod member is held in the rod holding portion, the rod member can be held such that the rod member is engaged with the receiving piece. Also, in case a rectangular rod member, such as a square pipe, is held in the holding portion, by pushing the rod member strongly, the receiving piece retreats inside the side wall and the rod member can be pushed to the bottom of the holding portion, so that the square rod member can be held inside the holding portion. Therefore, rod members having various shapes, for example both round rod member and square rod member, can be held by the holder of the invention, so that the rod holder of the invention can be conveniently used irrespective of the shapes of the rod members, and can be used for wide purposes.

In this case, as embodiments of the invention, the rod holder may be structured such that the holder main body is formed to have a U-shaped section and the rod holding portion in a groove form inside therein, and the windows of the holder main body are formed at both side walls to which the rod receiving pieces are integrally provided. Also, the rod holder can be structured such that the holder main body is formed to have an L-shaped section which enables that the rod holding portion in a groove form can be formed between the side wall of the holder main body and a wall to which the holder is mounted, and the rod member is held by inserting the rod member into the rod holding portion in the groove form.

Also, in order to prevent the rod member from falling off, it is advantageous that at an end portion of the opening, the holder main body is provide with a rod retaining piece which has a distal end extending inside the holding portion and abuts against the rod member to engage the same in case the rod member is held inside the holding portion. Also, the holder main body is provided with a connection part which connects the rod holder to another rod holder, or which engages a mounting hole of a member to which the holder is attached.

DETAILED DESCRIPTION OF PREFERRED EMBODIMENTS

Hereunder, embodiments of the present invention will be explained with reference to FIGS. 1 through 6(b).

FIGS. 1 through 4(b) show a rod holder according to an embodiment of the present invention, and the rod holder is preferably used as a holder for holding rod members, such as injection pipes in an automobile. The rod holder is formed of a holder main body 1 and a connection part 5 disposed at a lower end surface of the holder main body 1.

Figure 1:
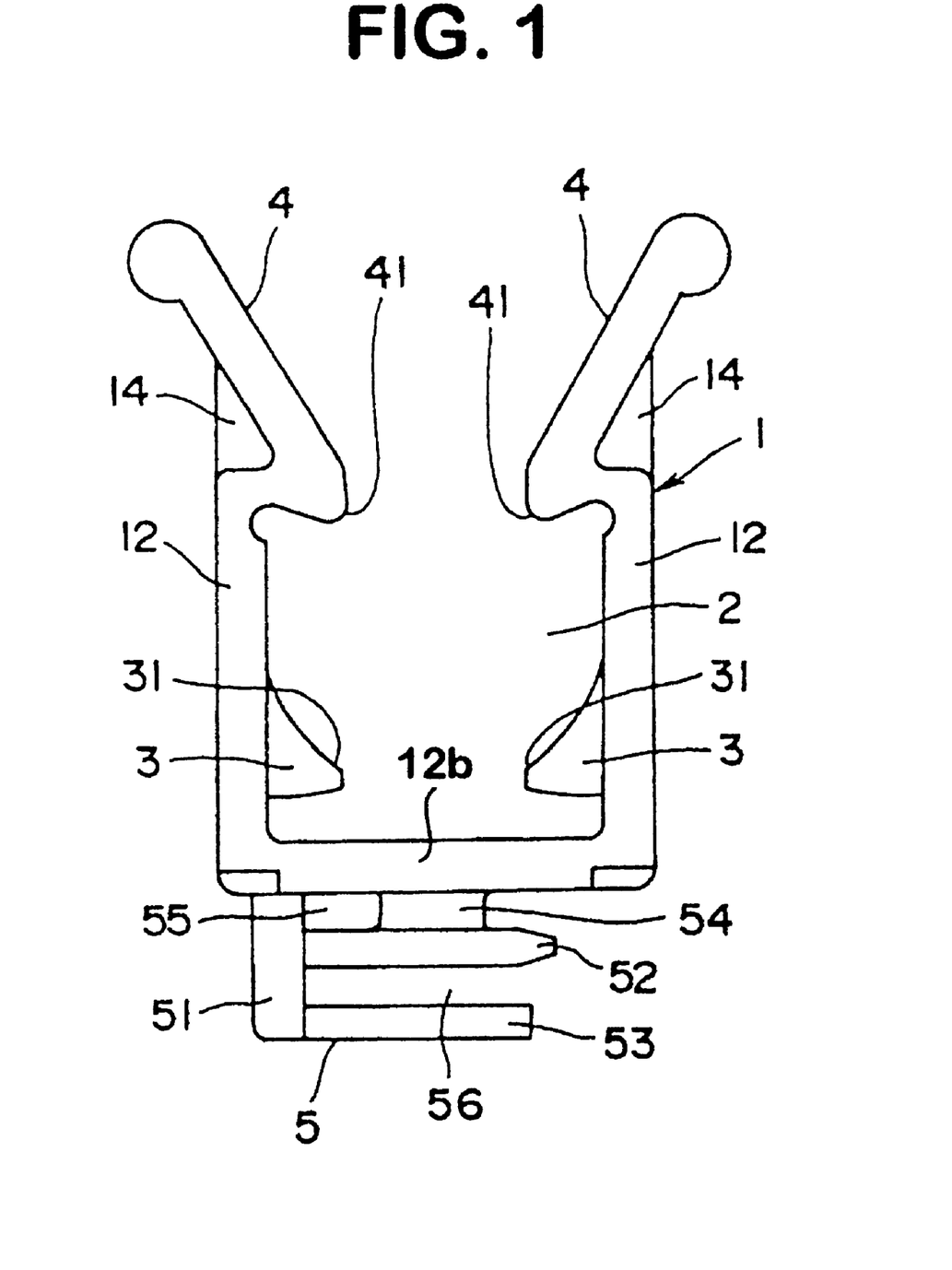
FIG. 1 is a front view of a rod holder according to an embodiment of the present invention.
Figure 2:
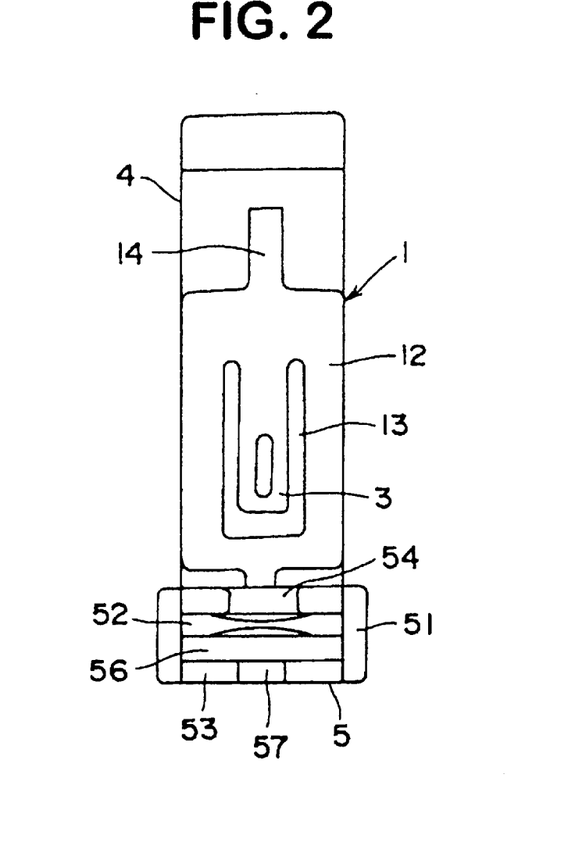
FIG. 2 is a side view thereof.
Figure 3:
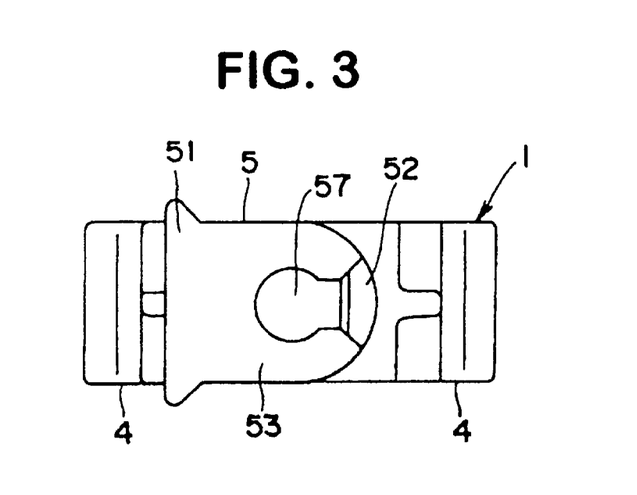
FIG. 3 is a bottom view thereof.

The holder main body 1 is made of plastic, and is formed to have a rectangular groove or U-shaped section, which has an open upper end and a rod holder portion 2 in a groove form, as shown in FIG. 1. Also, the respective upper end portions of both side walls 12 of the holder main body 1 are integrally formed with rod retaining pieces 4. In the retaining pieces 4, upper end sides protrude obliquely outwardly toward an upper side, and lower end sides thereof protrude obliquely inwardly toward a lower side. The projecting lower end portions extend inside the holding portion 2 to form retaining parts 41, and the retaining parts 41 make the width of an upper end opening of the holder main body 1 narrow.

In the holder main body 1 including the retaining pieces 4, when a rod member is inserted from the upper side of the upper end opening of the holder main body, the rod member first abuts against the retaining pieces 4. When the rod member is pushed, the upper side, i.e. side walls, of the holder main body 1 is elastically deformed outwardly to expand the upper end opening, so that the rod member can pass through the upper end opening. When the rod member is held inside the holding portion 2, the upper side, i.e. side walls, of the holder main body 1 is elastically returned to an original state. Incidentally, numeral 14 indicates a thin reinforcing rib.

Also, window portions 13 are respectively formed at center parts of both side walls 12 of the holder main body 1, and rod receiving pieces 3 are integrally formed with upper portions of the window portions 13, respectively. The rod receiving piece 3 is shaped to have a substantially triangle section inclining in an arc form at the inner surface. The lower end sides of the rod receiving pieces 3 normally protrude inside the holding portion 2.

When the rod member is pushed into the holding portion 2, the rod member abuts against projecting lower portions 31 of the receiving pieces 3, which project inwardly of the holding portion 2, so that the rod member is held by the projecting lower portions 31. Also, the receiving pieces 3 are formed elastically deformable. Thus, when the rod member is further pushed downwardly, the rod member pushes the projecting lower portions 31 outwardly, so that the projecting lower portions 31 retreat inside the window portions 13, and at the same time, lower outer parts thereof project outwardly from the window portions 13. By virtue of the elastic deformation of the receiving pieces 3, the projecting lower portions 31 are accommodated inside the window portions 13, so that the rod member is moved downwardly and abuts against a bottom wall 12b of the holding portion 2 to be held thereat.

The connection part 5 includes a plate-like supporting section 51 projecting from one side (left side in FIG. 1) of the bottom wall 12b of the holder main body 1; fitting parts 52, 53 projecting respectively from an intermediate part and a lower part of the support section 51 toward the other side of the bottom wall of the holder main body 1 (hereinafter, referred as the other side); and a connection section 54 connecting the intermediate fitting part 52 and the bottom wall of the holder main body 1. Portions of the fitting parts 52, 53 at the other side are formed in a semicircular shape, and the lower fitting part 53 is provided with a notch 57, which is opened toward the other side and has a circularly cut-out central part. Also, spaces 55, 56, in which fitting parts of the other member are fitted, are respectively formed between the bottom wall of the holder main body 1 and the intermediate fitting part 52, and between the fitting parts 52, 53.

Figure 4A:
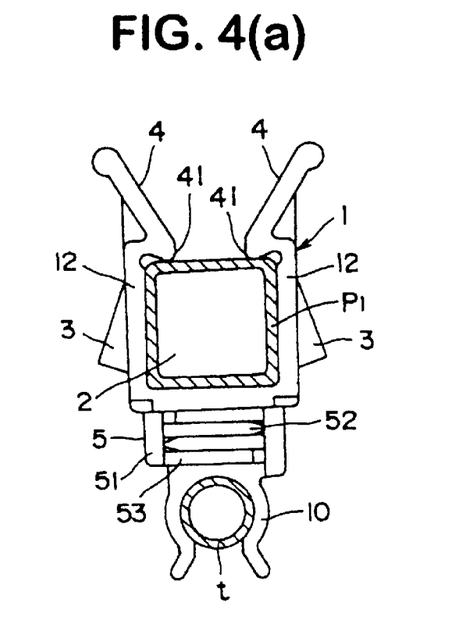
FIG. 4(a) is a front view of the rod holder showing a condition of holding a square pipe $P_1$.

In case a square pipe $P_1$ is held by the rod holder described above, the square pipe $P_1$ is inserted from the upper side of the rod retaining pieces 4 into the rod holding portion 2. Accordingly, the rod retaining pieces 4 are pushed outwardly by corner portions of the square pipe $P_1$ so that the upper portion, i.e. side walls, of the holder main body 1 is elastically deformed to open outwardly, and the upper end opening of the holder main body 1 is expanded. Then, the square pipe $P_1$ is inserted into the holding portion 2 and slides along both side walls 12 of the holder main body 1 to be pushed downwardly, and then, the square pipe $P_1$ abuts against the projecting lower portions 31 of the receiving pieces 3. In this state, when the square pipe $P_1$ is further pushed downwardly, the receiving pieces 3 are elastically deformed by a pressing force of the pipe, and the projecting lower portions 31 are pushed outwardly to be located inside the window portions 13, to thereby release an engaging condition of the projecting lower portions 31 with the square pipe $P_1$.

Thus, the pipe $P_1$ can be further pushed toward the bottom of the holding portion 2 and can stop at the bottom to be accommodated in the holding portion 2. When the square pipe $P_1$ is accommodated in the holding portion 2 as described above and the pressing forces from the pipe $P_1$ against the retaining pieces 4 are released, the upper end, i.e. side walls, of the holder main body 1 is elastically returned to the original state, and the retaining parts 41 of the retaining pieces 4 hold the upper end of the pipe $P_1$. Accordingly, the pipe is securely held inside the holding portion 2 under the condition that the pipe is prevented from falling off from the holding portion 2.

Figure 4B:
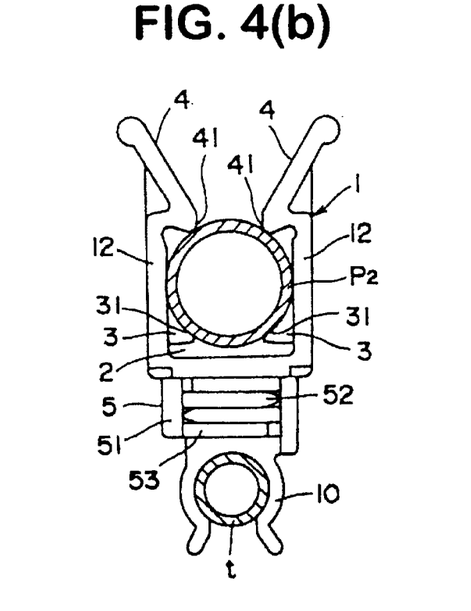
FIG. 4(b) is a front view showing a condition of holding a round pipe $P_2$.

Also, in case a round pipe $P_2$ is held by the above rod holder, as in the square pipe, the rod retaining pieces 4 and the upper end, i.e. side walls, of the holder main body 1 are pushed outwardly by the round pipe $P_2$ and deformed elastically, so that the opening is expanded. Then, when the round pipe $P_2$ abuts against the projecting lower portions 31 of the receiving pieces 3 to be held thereat, the rod retaining pieces 4 and the upper end of the holder main body 1 are returned together elastically to the original state, and the retaining parts 41 projecting at the lower ends of the retaining pieces 4 hold the upper surface of the round pipe $P_2$. Under the condition that the pipe $P_2$ is placed on the projecting lower portions 31 of the retaining pieces 3, the round pipe $P_2$ is held by the retaining parts 41 and the projecting lower portions 31 and retained thereat.

As described above, according to the rod holder of the present embodiment, in case the round pipe $P_2$ is held in the holding portion 2, the pipe is placed on the projecting lower portions of the receiving pieces, and in this condition the pipe can be held. Also, in case the square pipe $P_1$ is held in the holding portion 2, the square pipe $P_1$ can be held along the inner surfaces of the holding portion 2 by moving the projecting lower portions 31 of the retaining pieces 3 into the window portions 13. Namely, the rod members having different shapes, such as round pipe and square pipe, can be held in the same holding portion 2, and the holder can be used widely.

Also, although not shown in the figures, in case a square pipe having a width smaller than the square pipe $P_1$ shown in FIG. 4(a) is held by the rod holder as described above, the pipe can be accommodated in the holding portion 2 as in the case of holding the square pipe $P_1$. However, since this square pipe has the smaller width, the pipe is accommodated inside the holding portion 2 in the condition that the pipe is spaced from the inner surfaces of the side walls 12 of the holder main body 1. In this case, the square pipe having the smaller width is supported between the lower ends of the projecting lower portions 31 of the receiving pieces 3 by the elastic force in a clamping condition. Also, the pipe receives the downward pressing force by the retaining parts 41 of the retaining pieces 4. Thus, the square pipe with the smaller width can be securely held without moving or displacing in the traverse direction even if the square pipe is spaced from the inner surfaces of the side walls 12.

According to the aforementioned rod holder, it is structured such that both the square pipe $P_1$ and the round pipe $P_2$ can be held in the same holding portion 2. Therefore, it is not necessary to form a plurality of holding portions 2 in accordance with the shapes of the rod members such as the pipes. Thus, the rod holder can be manufactured comparatively easily, and a manufacturing cost thereof can be lowered.

Incidentally, in case the rod holder of the embodiment is used as a holder for holding, for example, an injection pipe, another holder for holding another rod member, such as rubber tube, can be connected thereto. As an example, FIGS. 4(a) and 4(b) show a condition that the rod holder of the embodiment is connected to a holder 10 having a connection part same as the connection part of the rod holder of the embodiment. Namely, the connection part 5 of the rod holder of the embodiment is fitted into a connection part of the holder 10 which has a substantially arc shape in section with open sides bent outwardly to hold a round tube t, so that the rod holder of the embodiment and the holder 10 can be connected to each other as shown in FIGS. 4(a) and 4(b).

Next, as another embodiment of the present invention, a rod holder shown in FIGS. 5 through 6(b) will be explained.

Figure 5:
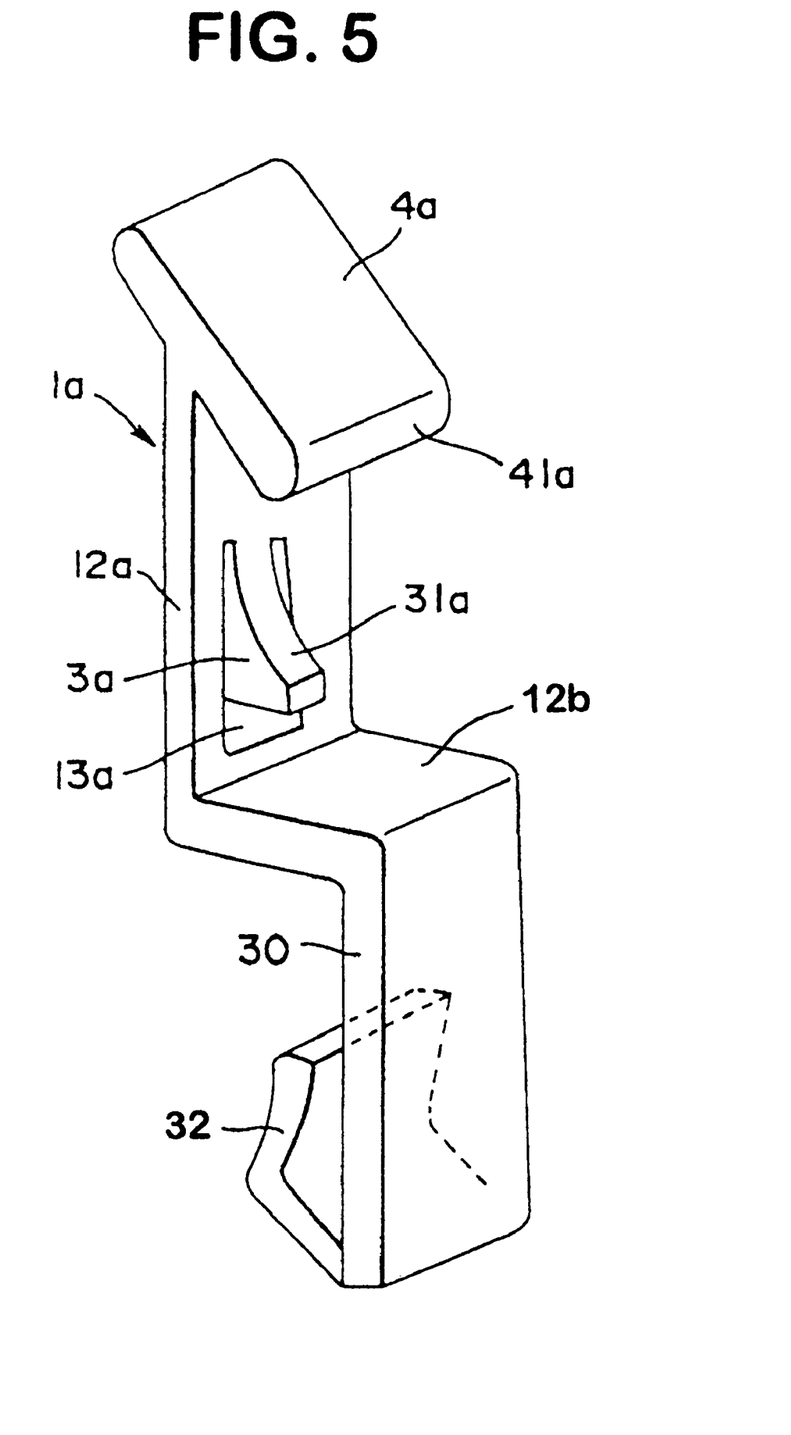
FIG. 5 is a perspective view showing a rod holder according to another embodiment of the present invention.

Namely, as shown in FIG. 5, the rod holder is formed of a holder main body 1a and a plate-form fixing leg 30 (connection part) protruding downwardly from a lower outer end of the holder main body 1a. The holder main body 1a is bent inwardly to have an L-shape in section, and a side wall 12a and a bottom wall 12b thereof form a holding portion 2a in a rectangular groove shape between the holder main body 1a and a wall r to which the holder is attached in case the holder is fixed to the wall. Also, the side wall 12a of the holder main body 1a is provided with a window section 13a and a receiving piece 3a having a projecting lower portion 31a as in the embodiment of FIGS. 1 through 4(b). Further, an upper end portion of the side wall 12a is integrally formed with a retaining piece 4a as in the embodiment of FIGS. 1 through 4(b), which includes a retaining part 41a at a lower end thereof protruding toward the holding portion 2a, and an upper part inclined obliquely and upwardly. The fixing leg 30 is bent outwardly at a lower end, and is integrally provided with an elastically deformable engaging piece 32 engaging an attachment hole g of a member s as shown in FIGS. 6(a) and 6(b).

Figure 6A:
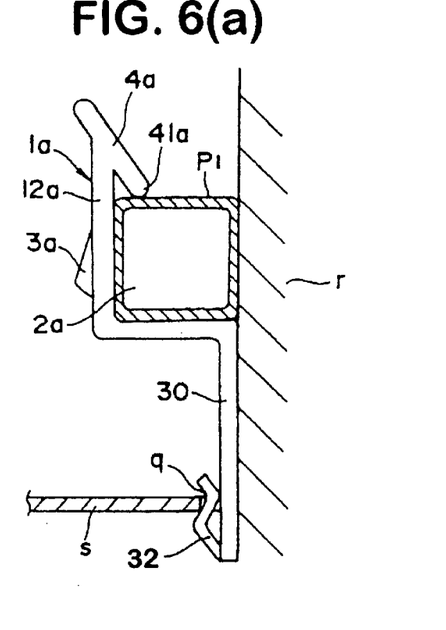
FIG. 6(a) is a front view of another rod holder showing a condition of holding a square pipe $P_1$.
Figure 6B:
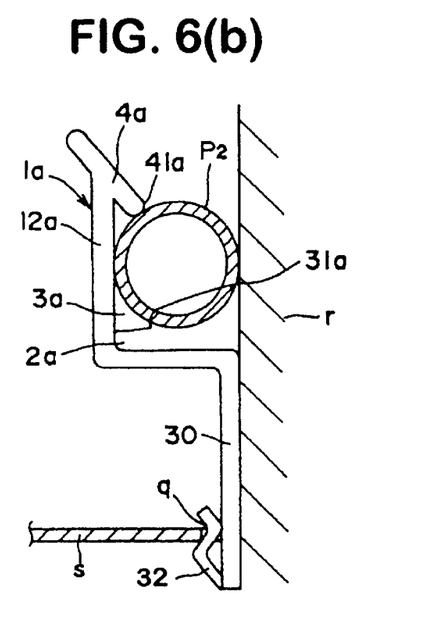
FIG. 6(b) is a front view showing a condition of holding a round pipe $P_2$.

In case the rod holder of this embodiment is used, as shown in FIGS. 6(a) and 6(b), an inner side of the fixing leg 30 is disposed to contact the wall r adjacent to the member s, and the engaging piece 32 of the fixing leg 30 is inserted into the attachment hole g formed in the member s to engage therewith, so that the rod holder is attached to the member s. In this state, the holding portion 2a in the groove form is formed between the side wall 12a of the holder main body 1a and an outer side wall of the wall r. The square pipe $P_1$ or round pipe $P_2$ is held in the holding portion 2a.

In case the square pipe $P_1$ is held in the holding portion 2a, both the retaining piece 4a and the upper side of the holder main body 1a are bent outwardly by inserting the square pipe $P_1$. When the pipe $P_1$ pushes the projecting lower portion 31a of the receiving piece 3a to thereby elastically deform the receiving piece, the projecting lower portion 31a is located inside the window section 13a, and the pipe $P_1$ is placed on the bottom wall of the holder main body 1a. Accordingly, as shown in FIG. 6(a), the square pipe $P_1$ is held inside the holding portion 2a formed between the side wall 12a and the wall r, and the square pipe $P_1$ is urged downwardly by the retaining part 41a of the retaining piece 4a, so that the square pipe P₁ can be securely held in the holding portion 2a without falling off. Incidentally, as in the embodiment of FIGS. 1 through 4(a), even if the square pipe has a smaller width and accommodated inside the holding portion 2a while being spaced from the side wall 12a, the square pipe is pressed by an elastic force of the projecting lower portion 31a of the receiving piece 3a toward the wall r to be held securely.

On the other hand, when a round pipe P₂ is inserted into the holding portion 2a, both the retaining piece 4a and the upper side of the holder main body 1a are bent outwardly, and the pipe is engaged with the projecting lower end of the receiving piece 3a to be disposed thereat, so that the round pipe P₂ is held in the holding portion 2a. Accordingly, as shown in FIG. 6(b), the round pipe P₂ is held between the retaining part 41a of the retaining piece 4a and the projecting lower portion 31a of the receiving piece 3a to be retained therebetween.

Incidentally, the rod holder of the present invention is not limited to the aforementioned embodiments, and can be modified as long as the gist of the present invention is maintained. For example, shapes of the receiving pieces 3, 3a and the retaining pieces 4, 4a are not limited to the shapes shown in the figures, and the structure of the connection part 5 can be freely modified. Furthermore, rod members held by the rod holder of the invention are not limited to the square pipe P₁ and the round pipe P₂, and various pipes and rods having various shapes can be held by the rod holder of the invention. Structures of the other members can be modified as long as the gist of the present invention is maintained.

As described above, according to the rod holder of the invention, the holding portion of the rod holder can hold not only a round rod member but also a square rod member, so that the rod holder of the invention can securely hold the rod member irrespective of the shapes of the rod members. Thus, the holder can be used widely, and the holder can be manufactured relatively easily and at a low cost.

While the invention has been explained with reference to the specific embodiments of the invention, the explanation is illustrative and the invention is limited only by the appended claims.

What is claimed is:

1. A rod holder for holding rod members with different shapes comprising:

a holder main body having two side walls, a bottom wall attached to the two side walls to form a rectangular rod holding portion surrounded by the side walls and the bottom wall, and an opening provided at one side of the holder main body opposite to the bottom wall and communicating with the rod holding portion, said opening being enlarged when the rod member is inserted into the opening and elastically returned to an original position when the rod member is inserted in the rod holding portion after passing through the opening, windows provided in the side walls of the holder main body, one window being formed in one side wall, rod receiving pieces integrally formed with the side walls and situated in the respective windows, each rod receiving piece having a lower portion with a curved upper surface projecting inside the rod holding portion to be able to support a round rod member, and being elastically deformable by an outward pressing force so that the rod receiving piece with the lower portion is located outside the rod holding portion to be able to hold a rectangular rod member in the rod holding portion, and means for attaching the holder main body to another member formed on the holder main body.

2. A rod holder according to claim 1, further comprising rod retaining pieces provided at upper ends of the side walls and having distal ends extending toward the rod holding portion to define the opening therebetween.

3. A rod holder according to claim 1, wherein said window is defined by a slit formed in the side wall.

4. A rod holder according to claim 1, wherein each rod receiving piece includes a flat portion located in a plane of each side wall, said lower portion with the curved upper surface only projecting into the rod holding portion.

5. A rod holder for holding rod members with different shapes comprising:

a holder main body having one side wall, a bottom wall attached to the side wall to extend substantially perpendicularly therefrom to form a rectangular rod holding portion surrounded by the side wall and the bottom wall, and an opening at a side opposite to the bottom wall to communicate with the rod holding portion, said opening being enlarged when the rod member is inserted into the opening and elastically returned to an original position when the rod member is inserted in the rod holding portion after passing through the opening, a window provided in the side wall of the holder main body, a rod receiving piece integrally formed with the side wall and situated in the window, said rod receiving piece having a lower portion with a curved upper surface projecting inside the rod holding portion to be able to support a round rod member and being elastically deformable by an outward pressing force so that the rod receiving piece with the lower portion is located outside the rod holding portion to be able to hold a rectangular rod member in the rod holding portion, and means for attaching the holder main body to another member formed on the holder main body.

6. A rod holder according to claim 5, further comprising a rod retaining piece provided at an upper end of the side wall and having a distal end extending in the rod holding portion to define the opening, said retaining piece abutting against the rod member to engage therewith when the rod member is held in the rod holding portion.

7. A rod holder according to claim 6, wherein said means for attaching the holder main body includes a fixing leg with a flat surface extending downwardly from the bottom wall, and an engagement piece formed at a lower end of the fixing leg.

8. A rod holder according to claim 5, wherein said rod receiving piece includes a flat portion located in a plane of the side wall, said lower portion with the curved upper surface only projecting into the rod holding portion.

\* \* \* \* \*